United States Patent [19]

Mailey

[11] Patent Number: 5,337,983

[45] Date of Patent: Aug. 16, 1994

[54] IN-TOTO CONNECTOR

[75] Inventor: John W. Mailey, Grand Blanc, Mich.

[73] Assignee: MCAM Industries, Inc., Flint, Mich.

[21] Appl. No.: 945,016

[22] Filed: Sep. 15, 1992

[51] Int. Cl.⁵ ............................ B25G 3/00; F16L 3/00
[52] U.S. Cl. .................................. 248/74.3; 248/68.1;
403/405.1; 403/DIG. 9
[58] Field of Search ................ 403/405.1, 409.1, 397,
403/392, DIG. 9; 24/16 PB, 30.5 P; 248/74.3,
68.1, 610, 74.2

[56] References Cited

U.S. PATENT DOCUMENTS

| | | | |
|---|---|---|---|
| 2,416,063 | 2/1947 | Nicholls | 248/74.3 |
| 2,923,760 | 2/1960 | Famely | 248/74.3 |
| 3,913,187 | 10/1975 | Okuda | 248/74.3 |
| 4,437,633 | 3/1984 | André248 | 68.1/ |
| 4,735,387 | 4/1988 | Hirano | 248/74.3 |
| 4,784,358 | 11/1988 | Kohut | 248/74.3 |
| 4,978,091 | 12/1990 | Anderson | 248/74.3 |

FOREIGN PATENT DOCUMENTS

| | | | |
|---|---|---|---|
| 2302435 | 9/1976 | France | 248/74.3 |
| 2617942 | 1/1989 | France | 248/74.3 |

Primary Examiner—P. Austin Bradley
Assistant Examiner—Rex E. Pelto
Attorney, Agent, or Firm—Harness, Dickey & Pierce

[57] ABSTRACT

There is provided a cable tie which incorporates a cushioning means which also functions as a retaining means. The cable tie comprises a housing and a strap. The strap can be separate from or integral with the housing. When the free end of the strap is assembled within the housing, a plurality of angularly extending fins maintains the integrity of the assembled components. A second plurality of longitudinal fins extend angularly from the inside circumference of the assembled clamp. The resiliency of the fins provides a cushioning to the device encircled by the strap. In addition the second plurality of longitudinally extending fins provide a resistance means to the sliding of the cable tie in a direction along a vehicle bracket or other member to which the cable tie is attached or to the longitudinal movement of the wiring harness within the cable tie itself. Another embodiment of the cable tie comprises a housing which is adapted to be secured to a separate vehicular member and utilizes a plurality of the tie straps to secure the housing to a wiring harness or other object.

12 Claims, 2 Drawing Sheets

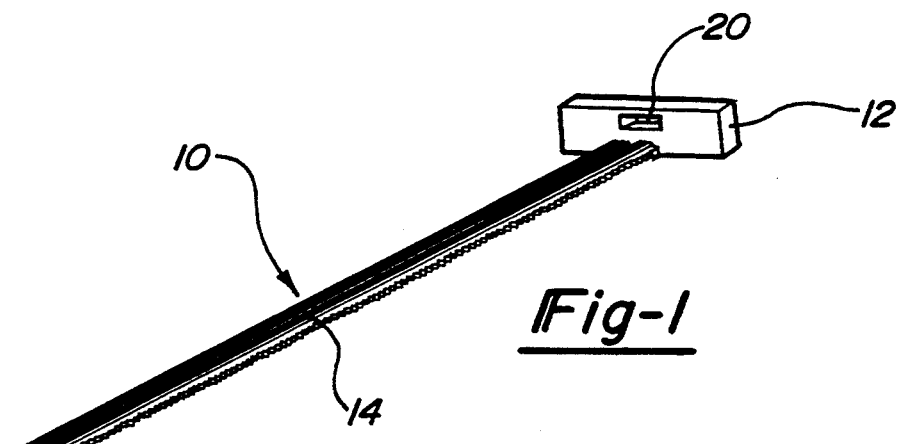
Fig-1
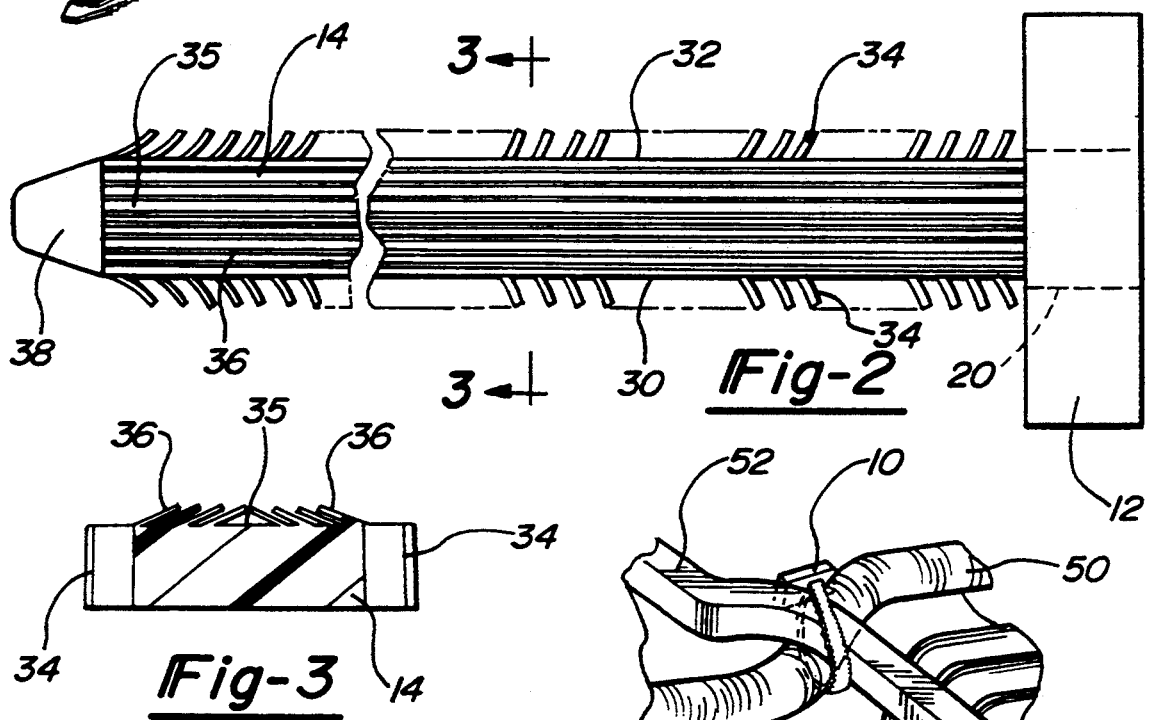
Fig-2
Fig-3
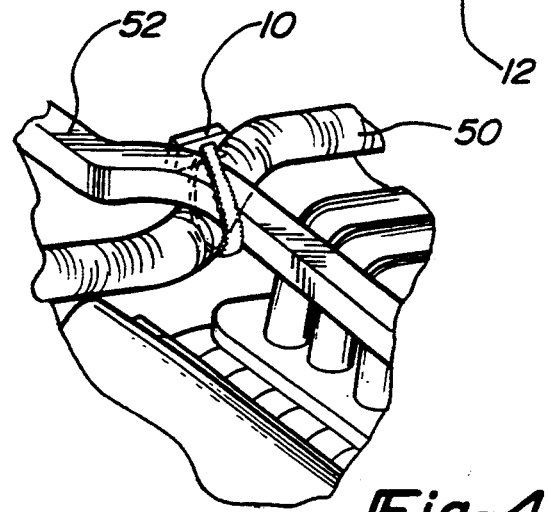
Fig-4
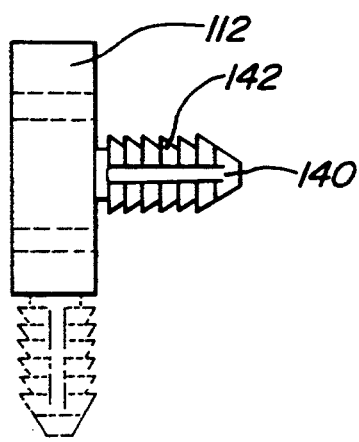
Fig-6A
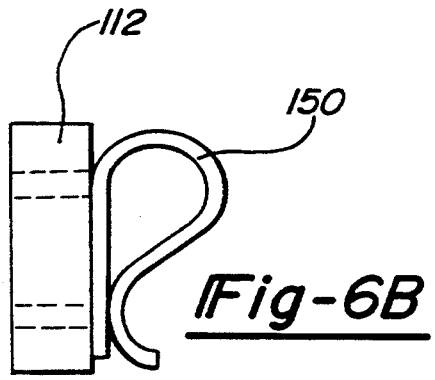
Fig-6B

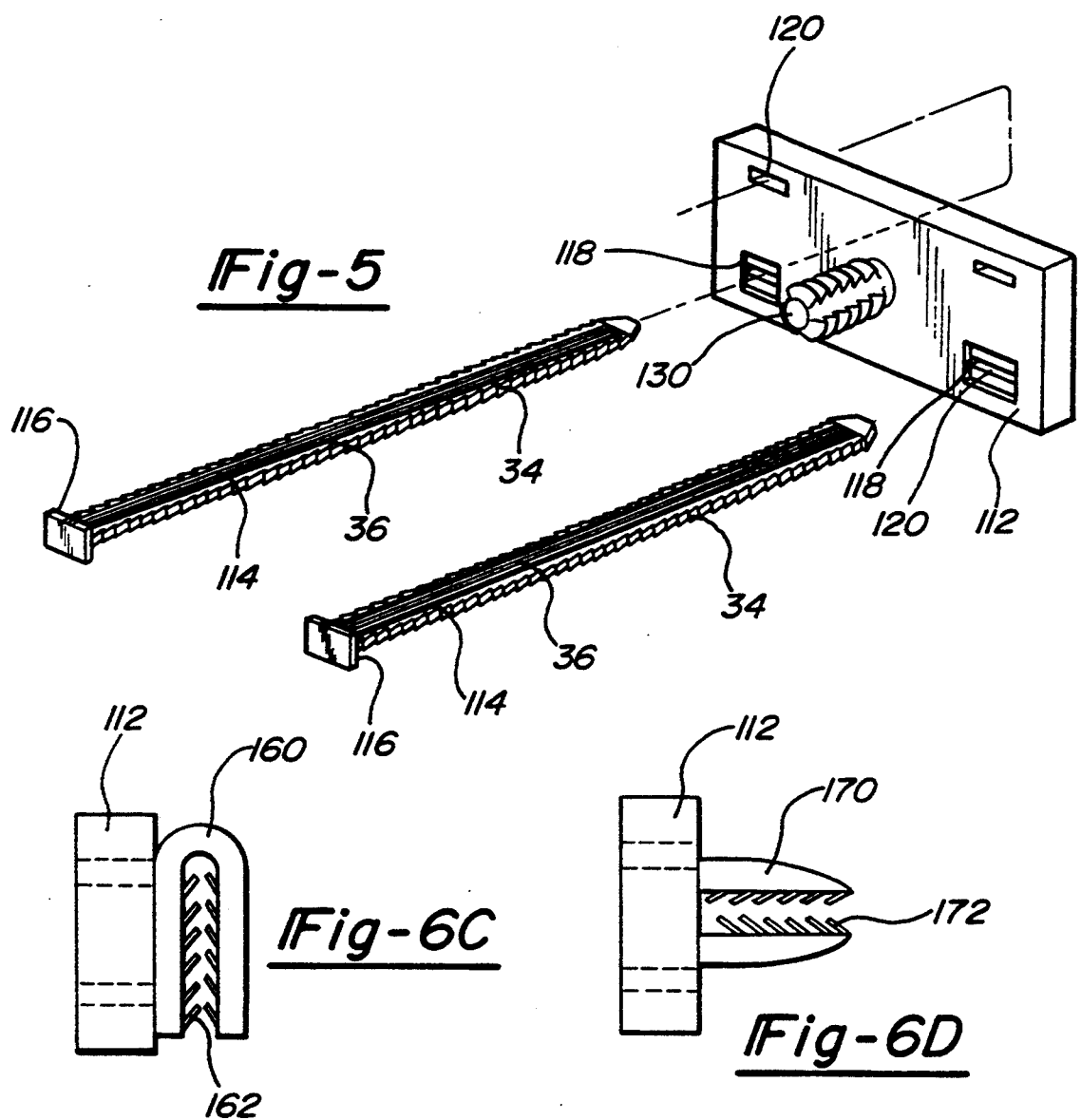
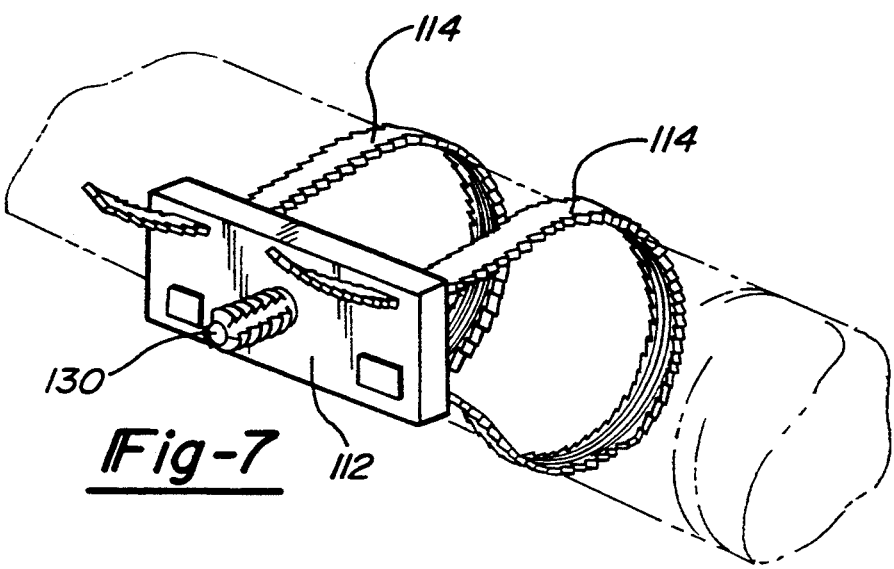

IN-TOTO CONNECTOR

FIELD OF THE INVENTION

The present invention relates to cable ties or tie straps. More particularly, the present invention relates to a cable tie which incorporates an integral cushioning means which also serves as a retaining means to maintain the position of the strap once it has been installed.

BACKGROUND OF THE INVENTION

Cable ties are well known devices and are used throughout the home and industry in a multitude of applications. The automotive industry, in particular, uses a large number of cable ties and straps during the manufacture and assembly of automotive vehicles. One particular use for cable ties by the automotive industry is to position and secure the wiring harnesses of the vehicle as they wind their way through the vehicle.

While the present invention will be described for exemplary purposes in an automotive application to position and secure a wiring harness at specified positions in an automotive vehicle, it is to be understood that the cable tie of the present invention can be utilized in any type of application which requires or could use a cable tie.

Wiring harnesses are used throughout the automotive vehicle to carry electrical power from the battery or alternator to the various electrical devices throughout the vehicle. Normally, power is supplied by the alternator and/or battery to a fuse block which in turn distributes the power to the variety of circuits responsible for the total operation of the vehicle. In order to simplify assembly, the automotive industry uses a number of wiring harnesses to distribute the power throughout the vehicle. A wiring harness is comprised of a plurality of wires grouped together and normally secured by some type of a sleeve. As each of the wiring harnesses traverses along its path through the vehicle, individual wires responsible for individual components either enter or leave the harness as the vicinity of each respective electrical component is reached. Due to this constant reduction and sometimes increase in the number of wires present in the wiring harness, the diameter of the wiring harness is an ever changing size.

The wiring harnesses are one of the first components to be assembled into the vehicle. When a wiring harness is assembled into a vehicle, it is necessary to position the wiring harness along a specified route to insure that the appropriate wire and wire connectors are positioned in the vicinity of their respective electrical components. In addition, the specified routing of the wiring harness insures that the wiring harness will not be damaged by or pinched between other components of the vehicle as the vehicle progresses along the assembly line. Once assembled in the vehicle, the positioning of the wire harness along its specified route also guarantees that during the operation of the vehicle the various components of the vehicle which are in motion will not damage the wiring harness.

In order to hold the wiring harnesses in their proper position along their specified routes through the vehicle, a plethora of clip and strap assemblies have been developed by the automotive manufacturers. Every time that the wiring harness changes in size, a new clip or strap needs to be designed. This requirement comes from the problem that during the life of the vehicle, the wiring harness must be adequately held in position. Strapping the wiring harness too tight can lead to abrasion of the insulation material by vibrations working on an edge of the strap. Strapping the wiring harness too loose can lead to slipping or movement of the wiring harness causing abrasion or an interference with other components of the vehicle. Therefore, every time a wire leaves or enters a wiring harness a new diameter clip or strap assembly is required. In addition to the complexity involved in the various sizes of clip and strap assemblies required, the complexity is further increased by the variety of ways in which the clip or strap assemblies interface with the vehicle. The cost to the automotive manufacturer for maintaining an individual active part number for each clip or strap assembly is substantial. By having a wide variety of clip and strap assemblies in varying sizes, each clip or strap assembly represents a separate part number with its associated individual costs of ordering, tracking, inventory, quality control, service and the like.

In an effort to reduce the complexity and the number of part numbers with their associated costs, the industry has looked at adjustable clip and strap assemblies. A variety of types of adjustable clip and strap assemblies have been tried by the automotive industry with varying degrees of success. One application involves the strapping of an attachment or securing device to the wiring harness itself. The securing device is then used to locate and secure the wiring harness to the vehicle by the use of integral hooks, clips, etc. These securing devices are normally positioned along the length of the wiring harness. When the prior art adjustable clip or strap assembly is being used to hold a securing device on the wiring harness itself, the proper amount of tension can not reliably be placed on the adjustable clip or strap assembly. Too much tension causes abrasion of insulating material by vibrations working on an edge of the strap as mentioned earlier and too little tension will not insure that the wiring harness will be adequately secured to the vehicle. This can cause slipping or movement of the wiring harness with the associated abrasion or interference. Another application tried for adjustable clip and strap assemblies has been applications where the wiring harness is going to be secured to a cross member or bracket in the vehicle. When the prior art adjustable clip or strap assembly is being used to secure the wiring harness to a bracket or cross member, the clip or strap assembly must be tight enough not to permit slippage of the wiring harness with respect to the strap or slippage of the strap along the cross member or bracket. The adjustable clip or strap assembly must also not be excessively tightened to cause abrasion of the insulation material. The tolerance band for acceptable tightening of the prior art adjustable strap has proven to be too small when a production environment is encountered.

Accordingly, what is needed is an adjustable style of tie strap which is capable of adequately holding both a securing device onto the wiring harness as well as being capable of securing the wiring harness to a bracket or cross member of the vehicle. The adjustable strap should have an adequate range of acceptable adjustment to simplify the proper attachment of the securing device to the wiring harness. In addition, the strap should present a cushioning surface to eliminate any abrasion of the insulation. The strap should also resist movement of the wiring harness when positioned around a bracket or other support member of the vehicle.

SUMMARY OF THE INVENTION

The present invention provides the art with an adjustable cable tie or strap which incorporates a plurality of angular fins which project from at least one surface of the body of the strap so that when the strap is applied to an object such as a wiring harness, the fins are in contact with the object. In other words, the fins project towards what will be the inside diameter of the strap when it is utilized around an object. The angular fins thus operate to present a cushioned surface to the wiring harness by cushioning the strap as it engages the wiring harness. This not only reduces the abrasion of the insulation, but it also allows for a wide variation on the tightening of the strap for obtaining the proper tension. In addition, the angular fins operate to resist movement of the strap and thus the wiring harness in a direction generally perpendicular to the wiring harness. The adjustable cable tie or strap can be manufactured by standard injection molding techniques. By providing an adjustable cable tie or strap which resists slippage of the wiring harness and the possibility of abrasion, the present invention is capable of being utilized in a wide variety of applications. The wide use of the present invention permits a significant reduction in the quantity of different clip or strap assemblies thus reducing the complexity and the associated costs.

From the subsequent detailed description, appended claims and drawings, other objects and advantages of the present invention will become apparent to those skilled in the art.

DESCRIPTION OF THE DRAWINGS

FIG. 1 is a perspective view of the cable tie of the present invention.

FIG. 2 is a top view of the cable tie shown in FIG. 1 showing the retaining means for retaining the cable tie at the selected diameter.

FIG. 3 is an enlarged cross sectional view taken along lines 3—3 of FIG. 2 showing the plurality of angular fins.

FIG. 4 is a perspective view showing a cable tie in use in a typical automotive application.

FIG. 5 is a view of another embodiment of the present invention where a securing device is to be attached to a wiring harness.

FIGS. 6A–6D are views showing a variety of types of securing devices which can be incorporated into the cable tie system shown in FIG. 5.

FIG. 7 is a perspective view showing the embodiment of FIG. 5 in use on a typical wiring harness.

DESCRIPTION OF THE INVENTION

The cable tie of the present invention is shown in FIGS. 1-3 and is designated by reference numeral 10. Cable tie 10 comprises a connecting block 12 and a strap 14. These members can be manufactured as an integral unit as shown in FIG. 1 or they can be manufactured as separate components and assembled together similar to the embodiment shown in FIG. 5.

Connecting block 12 is shown as a rectangular shaped block for exemplary purposes. Block 12 is not to be limited to a rectangular shape and can be virtually any shape depending upon the individual applications. Block 12 has a first rectangular shaped aperture 20 extending completely through block 12. When cable tie 10 is comprised of two separate pieces, a second rectangular shaped through aperture (not shown) would be disposed below, and in general alignment with, aperture 20.

Strap 14 is a longitudinal strap which is generally rectangular in cross section. Opposing faces 30 and 32 of strap 14 have a plurality of rectangular retaining fins 34 extending angularly from faces 30 and 32. Retaining fins 34 are inclined towards connecting block 12. Strap 14 also has a plurality of longitudinal cushioning fins 36 extending angularly from face 35. Face 35 is the face of strap 14 which will become the inside of strap 14 after assembly of strap 14 around a wiring harness or other object as will be described later herein.

When strap 14 is placed around a wiring harness or other apparatus, the free end 38 of strap 14 is fed through aperture 20 to secure strap 14 as shown in FIG. 4. The size and shape of aperture 20 are selected such that the main body and collapsed retaining fins 34 of strap 14 fit through aperture 20. Once the desired portion of the plurality of retaining fins 34 pass through aperture 20, the resilience of the material springs them back to their original angularly extended position. In this extended position, retaining fins 34 resist the movement of strap 14 in a reverse direction through aperture 20. Thus, when strap 14 is inserted through aperture 20, a continued pulling of strap 14 through aperture 20 will result in an ever decreasing diameter being formed by strap 14. Any effort to increase the size of the diameter formed by strap 14 will be resisted by retaining fins 34 acting against connecting block 12.

Cushioning fins 36 are positioned longitudinally along face 35 of strap 14 such that they are located on the inside circumference of strap 14 once it is assembled around a wiring harness or other object to be secured. Due to the resilience of the material used for strap 14, cushioning fins 36 will contact the encircled wiring harness or other object first. This initial contact with cushioning fins 36 followed by a continuation of tightening of strap 14 will cause the deflection of cushioning fins 36 and provide a cushioning effect for the contact between strap 14 and the wiring harness or other object.

As can be seen in FIG. 3, the plurality of cushioning fins 36 are positioned longitudinally such that approximately one half of cushioning fins 36 are angled in one direction and the other approximately one half of cushioning fins 36 are angled in the opposite or opposing direction. Once strap 14 is assembled around the wiring harness or apparatus and strap 14 is tightened to the point of compressing cushioning fins 36, each approximately one half of cushioning fins 36 will resist movement in a longitudinal direction along the wiring harness or other object as such movement between the wiring harness and cushioning fins 36 attempts to bend cushioning fins 36 backwards. By having approximately one half of cushioning fins 36 pointing in opposite directions, it is possible to resist longitudinal movement along the wiring harness (or of the wiring harness within the cable ties 10) in both directions.

An additional feature of cushioning fins 36 is the amount of tolerance available to the assembly individual when tightening strap 14. Strap 14 will function to resist longitudinal movement discussed above from the time that initial contact with cushioning fins 36 is made to the time that they are completely collapsed. The amount of tolerance available for tightening strap 14 can be calculated by comparing the difference between the effective inside circumference of strap 14 when cushioning fins 36 are fully extended and the effective inside circumference of strap 14 when cushioning fins 36 are fully collapsed. This difference in circumferences will of course vary with the diameter of the wiring harness or other object being strapped.

FIG. 4 shows cable tie 10 holding a wiring harness 50 to a cross member or bracket 52 for an automotive vehicle. When used in this type of an application, cushioning fins 36 will be compressed by virtue of their contact with bracket 52 in addition to wiring harness 50 and will thus resist movement of wiring harness 50 along bracket 52 due to the engagement of cushioning fins 36. Movement of wiring harness 50 with respect to cable tie 10 will also be resisted by the contact with cushioning fins 36.

Referring now to FIG. 5, a cable tie system embodying the present invention is shown and is designated by the reference numeral 100. Cable tie system 100 comprises a connecting block 112 and a plurality of tie straps 114. These members can be manufactured as an integral unit similar to that shown in FIG. 1 or they can be manufactured as separate components and assembled together as shown in FIG. 5.

Tie straps 114 are each a longitudinal strap which is generally rectangular in cross section. Tie straps 114 are substantially identical to strap 14 except for an integral shoulder 116 which is required when tie straps 114 are manufactured as a separate piece. Tie straps 114 each have identical retaining fins 34 and cushioning fins 36 which function in an identical manner to that described above.

Connecting block 112 is shown as a rectangular shaped block for exemplary purposes. Block 112 is not to be limited to a rectangular shape and can be virtually any shape depending upon the individual application. Block 112 has a pair of rectangular shaped apertures 120 for each of the plurality of tie straps 114 (2 in the case of FIG. 5). Each rectangular aperture 120 has a rectangular recess 118 for accepting shoulder 116 and providing a flush surface when tie strap 114 is inserted into either of its respective pair of apertures 120.

Positioned between two of the pairs of apertures 120 is a means 130 for attaching block 112 to another component of the vehicle. FIGS. 6A-6D show a number of alternative embodiments for the attaching means 130. For example, FIG. 6A shows a generally cylindrical stud 140 having a plurality of fins 142 angled from stud 140 towards block 112. These fins function similar to retaining fins 34 wherein cylindrical stud 140 is inserted into an appropriately sized hole and fins 142 resist the removal of stud 140 and thus block 112. Stud 140 can be located on a surface perpendicular to or parallel to tie strap 114 as shown in phantom in FIG. 6A, depending on the individual application. FIG. 6B shows a typical clip 150 integrally molded with block 112. Clip 150 is designed to clip onto or into another component within the vehicle. Clip 150 can be oriented at any angle relative to block 112 or it can be located on virtually any surface of block 112. FIG. 6C shows another type of clip 160 which has a plurality of fins 162 positioned on the inside of clip 160. This style of clip is designed to accept an edge of a piece of sheet metal or plastic. Fins 162 resist disassembly or movement of clip 160 in a manner similar to fins 34 and 36. Clip 160, similar to clip 150, can be oriented at any angle relative to block 112 or it can be located on virtually any surface of block 112. FIG. 6D shows a clip 170 which has a plurality of fins 172. Clip 170 is substantially identical to clip 160 except the orientation is perpendicular to block 112 rather than parallel. The function of clip 170 is substantially identical to that of clip 160.

The assembly and function of cable tie system 100 is similar to that of cable tie 10. A first tie strap 114 is inserted through one of its respective pair of apertures 120 such that shoulder 116 will seat in recess 118 when strap 114 is tightened. Strap 114 is then placed around the wiring harness and threaded back through the other of its respective pair of apertures 120. Tie strap 114 is then tightened in a similar manner to that described above for strap 14. In a similar manner the remainder of tie straps 114 are positioned around the wiring harness and assembled with block 112. FIG. 7 shows cable tie system 100 assembled to a typical wiring harness.

After assembly of the required cable tie system 100 around a wiring harness, the wiring harness is ready to be either packed away for shipment to the assembly plant or it can be immediately assembled into the vehicle. During assembly into the vehicle, the wiring harness is positioned within the vehicle and the various attaching means 130 are mated with their appropriate fixtures within the vehicle thus accurately and dependably locating the wiring harness. Each wiring harness should be supplied with as many cable tie systems 100 as is required to properly locate and secure the wiring harness within the vehicle.

While the above detailed description describes the preferred embodiments of the present invention, it should be understood that the present invention is susceptible to modification, variation and alteration without deviating from the scope and fair meaning of the subjoined claims.

What is claimed is:

1. A cable tie comprising:
   a housing having at least one through aperture;
   a strap having a first end and a second end, said first end of said strap mating with said housing;
   means for retaining said strap in said aperture of said housing when said second end of said strap is inserted into said aperture, said retaining means integral with and disposed along substantially the entire length of said strap between said first and second ends; and
   means for cushioning a device encircled by said strap, said cushioning means integral with and extending longitudinally along substantially the entire length of said strap between said first and second ends.

2. The cable tie of claim 1 wherein said retaining means comprises a plurality of fins angularly extending from at least one face of said strap.

3. The cable tie of claim 1 wherein said cushioning means comprises a plurality of fins angularly extending from one face of said strap.

4. The cable tie of claim 3 wherein each of said plurality of fins extend longitudinally along substantially the entire length of said strap between said first and second ends.

5. The cable tie of claim 3 wherein a portion of said plurality of fins extend in a first angular direction and the other portion of said plurality of fins extend in a second angular direction.

6. The cable tie of claim 1 wherein said strap is integral with said housing.

7. A cable tie system comprising:
   a housing having a plurality of through apertures;
   means for attaching said housing to a body, said attaching means integral with said housing;

a plurality of straps, each of said straps having a first end and a second end, said first end of each of said straps mating with said housing;

means for retaining each of said straps in a respective aperture of said housing when said second end of said strap is inserted into said respective aperture, said retaining means integral with and disposed along substantially the entire length of each of said straps between said first and second ends; and means for cushioning a device encircled by each of said straps, said cushioning means integral with and extending longitudinally along substantially the entire length of each of said straps between said first and second ends.

8. The cable tie system of claim 7 wherein said retaining means comprises a plurality of fins angularly extending from at least one face of each of said straps.

9. The cable tie system of claim 7 wherein said cushioning means comprises a plurality of fins angularly extending from one face of each of said straps.

10. The cable tie system of claim 9 wherein a portion of said plurality of fins extend in a first angular direction and the other portion of said plurality of fins extend in a second angular direction.

11. The cable tie system of claim 7 wherein said plurality of straps are integral with said housing.

12. The cable tie system of claim 9 wherein each of said plurality of fins extend longitudinally along substantially the entire length of said strap between said first and second ends.

* * * * *